(12) United States Patent
Wyckoff et al.

(10) Patent No.: US 11,469,805 B2
(45) Date of Patent: *Oct. 11, 2022

(54) MULTI-BEAM ANTENNA SYSTEM WITH A BASEBAND DIGITAL SIGNAL PROCESSOR

(71) Applicant: VIASAT, INC., Carlsbad, CA (US)

(72) Inventors: Peter S. Wyckoff, Scottsdale, AZ (US); Joseph J. Luna, Gilbert, AZ (US)

(73) Assignee: VIASAT, INC., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,147

(22) Filed: Sep. 21, 2021

(65) Prior Publication Data
US 2022/0077907 A1 Mar. 10, 2022

Related U.S. Application Data

(63) Continuation of application No. 17/258,345, filed as application No. PCT/US2019/041627 on Jul. 12, 2019, now Pat. No. 11,165,478.
(Continued)

(51) Int. Cl.
*H04L 5/12* (2006.01)
*H04B 7/06* (2006.01)
(Continued)

(52) U.S. Cl.
CPC .......... *H04B 7/0617* (2013.01); *H01Q 3/38* (2013.01); *H04B 7/0695* (2013.01); *H04L 27/3405* (2013.01)

(58) Field of Classification Search
CPC ...... H04B 7/0617; H04B 7/0695; H01Q 3/38; H04L 27/3405
(Continued)

(56) References Cited

U.S. PATENT DOCUMENTS 5,471,220 A 11/1995 Hammers et al.
6,166,705 A 12/2000 Mast et al.
(Continued)

FOREIGN PATENT DOCUMENTS

EP 2296225 3/2011
EP 2403067 1/2012
(Continued)

OTHER PUBLICATIONS

Nickel, "Properties of Digital Beamforming with Subarrays," 2006 CIE International Conference on Radar, pp. 1-5, doi: 10.1109/ICR.2006.343380. Found on the internet Jul. 15, 2021 at: hllps:// ieeexplore.ieee.org/ (2006).
(Continued)

*Primary Examiner* — Zewdu A Kassa
(74) *Attorney, Agent, or Firm* — Snell & Wilmer L.L.P.

(57) ABSTRACT

One example includes a phased-array antenna system (10). The system includes antenna elements (16) each including an element adjustment circuit (24) and a radiating element (114). A beamforming network (14) receives a carrier signal and generates element carrier signals. A baseband DSP (22) generates a plurality of composite beamforming data signals associated with a respective one of the antenna elements (16) and is generated based on combining individual beamforming data signals. Each of the individual beamforming data signals is associated with a respective beam and is based on combining a data signal associated with the respective beam with an antenna weight associated with the respective beam and the respective one of the antenna elements (16). The element adjustment circuit (24) modulates the associated composite beamforming data signal onto the respective element carrier signal to generate a respective element signal that is provided to the respective radiating
(Continued)

element (114), such that the beams are generated from the antenna elements (16).

20 Claims, 4 Drawing Sheets

Related U.S. Application Data

(60) Provisional application No. 62/697,518, filed on Jul. 13, 2018.

(51) Int. Cl.
*H01Q 3/38* (2006.01)
*H04L 27/34* (2006.01)

(58) Field of Classification Search
USPC .............. 375/262, 261, 259, 219, 295, 316
See application file for complete search history.

(56) References Cited

U.S. PATENT DOCUMENTS

| | | | |
|---|---|---|---|
| 6,456,252 | B1 | 9/2002 | Goyette |
| 6,597,312 | B1 * | 7/2003 | Hrycak ............... H01Q 3/30 342/372 |
| 9,195,951 | B2 | 11/2015 | Baks et al. |
| 9,281,254 | B2 | 3/2016 | Yu et al. |
| 10,290,586 | B2 | 5/2019 | Hu |
| 10,354,964 | B2 | 7/2019 | Yu et al. |
| 10,862,196 | B2 | 12/2020 | Haridas et al. |
| 11,165,478 | B2 | 11/2021 | Wyckoff et al. |
| 2007/0096982 | A1 | 5/2007 | Kalian et al. |
| 2007/0263748 | A1 | 11/2007 | Mesecher |
| 2008/0252521 | A1 | 10/2008 | Sabet et al. |
| 2009/0251368 | A1 | 10/2009 | McCune, Jr. |
| 2010/0190464 | A1 | 7/2010 | Chen et al. |
| 2012/0068906 | A1 | 3/2012 | Asher et al. |
| 2013/0027271 | A1 | 1/2013 | Kam et al. |
| 2014/0145883 | A1 | 5/2014 | Baks et al. |
| 2015/0097633 | A1 | 4/2015 | Devries et al. |
| 2015/0325925 | A1 | 11/2015 | Kamgaing et al. |
| 2015/0340765 | A1 | 11/2015 | Dang et al. |
| 2016/0049723 | A1 | 2/2016 | Baks et al. |
| 2017/0025749 | A1 | 1/2017 | Frye et al. |
| 2018/0247905 | A1 | 8/2018 | Yu et al. |
| 2019/0267716 | A1 | 8/2019 | Yoon et al. |
| 2019/0267722 | A1 | 8/2019 | Yoon et al. |
| 2020/0259267 | A1 | 8/2020 | Park et al. |
| 2020/0350696 | A1 | 11/2020 | Zhu et al. |

FOREIGN PATENT DOCUMENTS

| | | |
|---|---|---|
| EP | 3029901 | 6/2016 |
| EP | 3258537 | 12/2017 |

OTHER PUBLICATIONS

Kwak, et al.: "Monopulse Beam Synthesis Using a Sparse Single Layer of Weights," in IEEE Transactions on Antennas and Propagation, vol. 67, No. 4, pp. 2787-2791, Apr. 2019, doi10.1109/TAP. 2019.02899850. Found on on the internet Jul. 15, 2021 at hhttps://ieeexplore.ieee.org/document/8642818.

International Search Report and Written Opinion, dated May 19, 2021 in PCT International Patent Application No. PCT/US2021/012843.

Notice of Allowance dated Jun. 21, 2021 in U.S. Appl. No. 17/258,345.

Notice of Allowance dated Sep. 30, 2021 in U.S. Appl. No. 17/258,345.

* cited by examiner

MULTI-BEAM ANTENNA SYSTEM WITH A BASEBAND DIGITAL SIGNAL PROCESSOR

RELATED APPLICATIONS

The present invention is a continuation application of U.S. application Ser. No. 17/258,345, filed on 6 Jan. 2021, which is a U.S. National Stage under 35 USC 371 patent application, claiming priority to Serial No. PCT/US2019/041627, filed on 12 Jul. 2019, which claims priority from U.S. provisional application No. 62/697,518, filed on 13 Jul. 2018, the entirety of both of which are incorporated herein by reference.

TECHNICAL FIELD

This disclosure relates generally to communication systems, and more specifically to a multi-beam antenna system with a baseband digital signal processor.

BACKGROUND

An antenna array (or array antenna) is a set of multiple antenna elements that work together as a single antenna to transmit or receive radio waves. The individual antenna elements can be connected to a receiver and/or transmitter by circuitry that applies an appropriate amplitude and/or phase adjustment of signals received and/or transmitted by the antenna elements. When used for transmitting, the radio waves radiated by each individual antenna element combine and superpose with each other, adding together (interfering constructively) to enhance the power radiated in desired directions, and cancelling (interfering destructively) to reduce the power radiated in other directions. Similarly, when used for receiving, the separate received signals from the individual antenna elements are combined with the appropriate amplitude and/or phase relationship to enhance signals received from the desired directions and cancel signals from undesired directions.

SUMMARY

One example includes a phased-array antenna system. The system includes antenna elements each including an element adjustment circuit and a radiating element. A beamforming network receives a carrier signal and generates element carrier signals. A baseband DSP generates a plurality of composite beamforming data signals associated with a respective one of the antenna elements and is generated based on combining individual beamforming data signals. Each of the individual beamforming data signals is associated with a respective beam and is based on combining a data signal associated with the respective beam with an antenna weight associated with the respective beam and the respective one of the antenna elements. The element adjustment circuit modulates the associated composite beamforming data signal onto the respective element carrier signal to generate a respective element signal that is provided to the respective radiating element, such that the beams are generated from the antenna elements.

DETAILED DESCRIPTION

This disclosure relates generally to communication systems, and more specifically to a multi-beam antenna system with a baseband digital signal processor. An antenna system can be arranged as a phased-array antenna system that includes a plurality of antenna elements. The antenna system can include a beam source that provides a carrier signal to a beamforming network. The beamforming network can distribute a respective element carrier signal to each of the antenna elements based on the carrier signal. The antenna system includes a baseband digital signal processor (DSP) that is configured to generate a plurality of combined beamforming data signals that are each associated with a respective one of the antenna elements. The combined beamforming data signals are each generated based on a respective one of a plurality of beamforming signals and a plurality of data signals. Each of the data signals can correspond to a separate respective one of beams that are transmitted from the phased-array antenna system via the antenna elements.

For example, the baseband DSP can modulate the beamforming signals as complex weights onto each of the data signals to generate a set of modulated data signal. The baseband DSP can add each of the modulated data signals associated with a given one of the antenna elements to generate the combined beamforming data signals. The combined beamforming data signals can be polar coordinate converted to provide the combined beamforming data signals as including a phase portion and an amplitude portion to each of the antenna elements. As an example, the combined beamforming data signals can be provided as a phase-shift keying (PSK) code or an amplitude phase-shift keying (APSK) code. The phase portion and the amplitude portion can thus each be provided to at least one digital-to-analog converter (DAC) of a respective element adjustment circuit of the respective antenna element. The DAC(s) can convert the phase portion and the amplitude portion into at least one respective analog signal that is modulated onto the element carrier signal (e.g., via at least one of a phase-shifter and a variable gain amplifier (VGA)). Therefore, the element adjustment circuit can generate an element signal that is provided to a radiating element for transmission of the multiple beams from the antenna elements.

Figure 1:
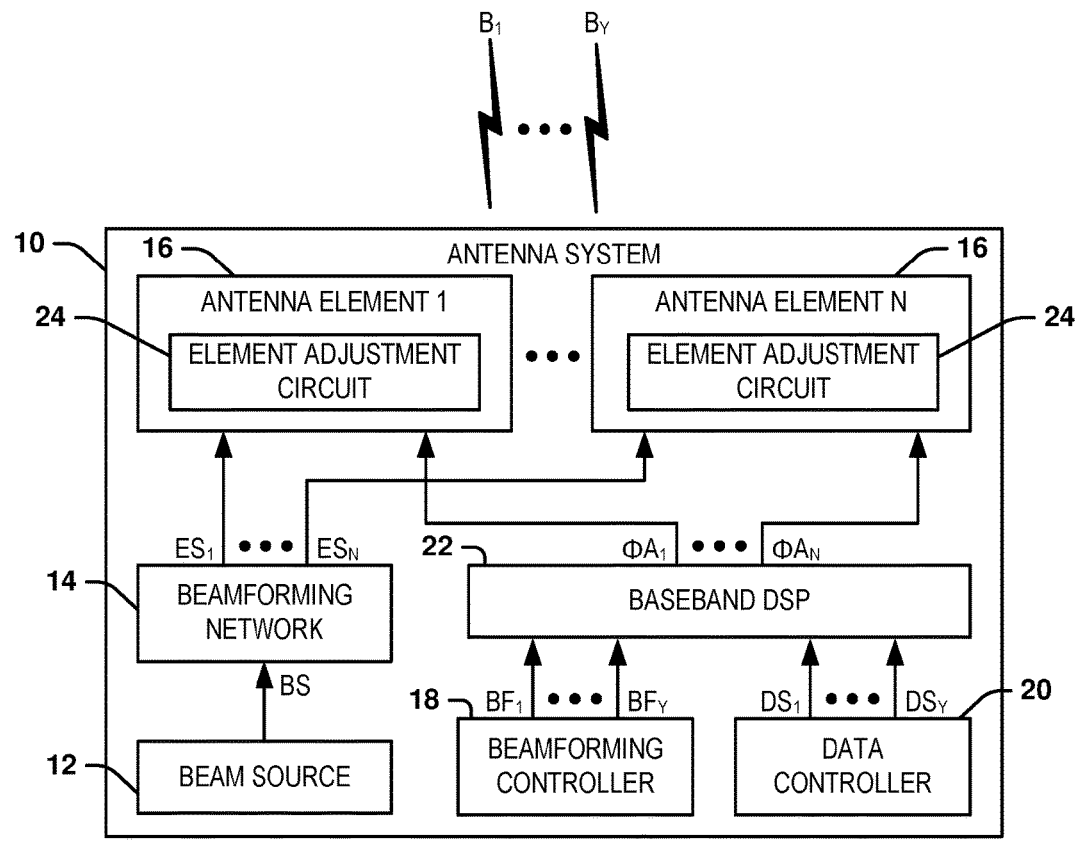
FIG. 1 illustrates an example of an antenna system.

FIG. 1 illustrates an example of an antenna system 10. The antenna system 10 can correspond to a phased-array antenna system, or can correspond to a single reticle of an antenna system that includes multiple substantially identical reticles. The antenna system 10 can thus transmit a plurality N of element signals as a plurality Y of separate beams, demonstrated in the example of FIG. 1 as beams $B_1$ through $B_Y$, in directions (e.g., in any of a variety of angles between 0° and approximately 60°) that is based on a relative phase of the element signals, as described in greater detail herein.

The antenna system 10 includes a beam source 12 that is configured to generate a carrier signal BS, such as based on a local oscillator configured to generate a reference signal at a predetermined frequency. As an example, the beam source 12 can be configured as a programmable synthesizer configured to provide the carrier signal BS at a predetermined frequency. The carrier signal BS is provided to a carrier signal port of a beamforming network 14 that is configured to generate a plurality N of element carrier signals ES, demonstrated in the example of FIG. 1 as element carrier signals $ES_1$ through $ES_N$, where N is a positive integer, at a plurality of element carrier signal ports. For example, the beamforming network 14 can be implemented as stages of divider circuits. The number of stages can vary from embodiment to embodiment. As an example, each divider circuit can be implemented as a power divider circuit, such as a Wilkinson power divider, a hybrid coupler, a directional coupler, or nearly any other circuit that can divide signals. As an example, N can be equal to sixty-four for a given reticle. The element carrier signals ES are provided to a respective plurality N of antenna elements 16 that can be formed in an array (e.g., a beamforming array). As described in greater detail herein, the antenna elements 16 can each be configured to transmit a respective element signal via a radiating element in a phase-shifted and/or amplified manner relative to each other to implement beamforming.

In addition, the antenna system 10 includes a beamforming controller 18 and a data controller 20. The beamforming controller 18 is configured to generate a plurality Y of beamforming signals $BF_1$ through $BF_Y$, where Y corresponds to the number of beams $B_1$ through $B_Y$ to be transmitted from the antenna system 10. Each of the beamforming signals BF can correspond to a set of complex antenna weights that defines phase and/or amplitude information to be applied to the element signals by the element adjustment circuits (described in more detail below) to form a given one of the beams $B_1$ through $B_Y$ to be transmitted from the antenna system 10. For example, based on the arrangement of the array of antenna elements 16 and the desired direction of the respective beams $B_1$ through $B_Y$ to be transmitted from the antenna system 10, the beamforming controller 18 can calculate the beamforming signals $BF_1$ through $BF_Y$ in any of a variety of ways (e.g., in response to one or more control signals (not shown)). Additionally, the directions of the beams $B_1$ through $B_Y$ can change (e.g., relative to each other) based on the operation of the beamforming controller 18.

Therefore, the beamforming signals BF can collectively define the beamforming information associated with the aggregate transmission of the element signals to provide transmission directions of the beams $B_1$ through $B_Y$ in respective predetermined directions for each of the multiple beams $B_1$ through $B_Y$ to be transmitted from the antenna system 10. As an example, the beamforming controller 18 can be configured as a processor or application specific integrated circuit (ASIC) configured to generate the beamforming signals BF in response to one or more commands associated with a desired transmission direction of the beams $B_1$ through $B_Y$ formed by the element signals. The data controller 20 is configured to generate a plurality of data signals DS, demonstrated in the example of FIG. 1 as data signals $DS_1$ through $DS_Y$, where Y corresponds to the number of beams $B_1$ through $B_Y$ to be transmitted from the antenna system 10. For example, the data signals $DS_1$ through $DS_Y$ can correspond to information data signals that are each modulated into the aggregate transmitted element signals.

In the example of FIG. 1, the beamforming signals $BF_1$ through $BF_Y$ and the data signals $DS_1$ through $DS_Y$ are demonstrated as being provided to a baseband digital signal processor (DSP) 22. The baseband DSP 22 is configured to modulate the beamforming signals $BF_1$ through $BF_Y$ and the data signals $DS_1$ through $DS_Y$ to generate combined beamforming data signals $\Phi A$, demonstrated as $\Phi A_1$ through $\Phi A_N$, that are each provided to a respective one of the antenna elements 16. Each of the combined beamforming data signals $\Phi A$ can include phase and amplitude information to provide beamforming for each of the data signals DS. For example, and as described in greater detail herein, the combined beamforming data signals $\Phi A$ can be generated in the digital domain to be modulated into the respective element carrier signals ES at the respective antenna elements 16, such that the antenna elements 16 can transmit multiple beams $B_1$ through $B_Y$ corresponding to the respective data signals $DS_1$ through $DS_Y$ based on the phase and amplitude information associated with the beamforming signals $BF_1$ through $BF_Y$. While the quantity Y is demonstrated for both the data signals $DS_1$ through $DS_Y$ and the beamforming signals $BF_1$ through $BF_Y$, it is to be understood that the beamforming controller 18 and the data controller 20 are not limited to providing an equal number of data signals DS and beamforming signals BF. For example, the same data signal DS can be transmitted via multiple beams B.

In the example of FIG. 1, the antenna elements 16 each include an element adjustment circuit 24. The element adjustment circuit 24 can modulate the combined beamforming data signals $\Phi A$ into the respective element carrier signals ES to generate the respective element signal for transmission. For example, the element adjustment circuit 24 can include at least one digital-to-analog converter (DAC) to convert a respective at least one of a phase portion and an amplitude portion of the combined beamforming data signals $\Phi A$ into a respective at least one analog signal. The element adjustment circuit 24 can include a respective at least one of a phase-shifter and a variable gain amplifier (VGA) to adjust the phase and/or amplitude of the respective element carrier signal ES based on the analog signal(s) to generate the respective element signal. Therefore, the element signal can be transmitted from each of the respective antenna elements 16 (e.g., via a radiating element) to provide transmission of multiple independent beams $B_1$ through $B_Y$ concurrently in a phased-array manner.

For example, each of the beams $B_1$ through $B_Y$ can be associated with a respective one of the data signals $DS_1$ through $DS_Y$, and the complex baseband signal of the respective data signal DS can be part of the individual beamforming data signal that is generated for each antenna element 16. As a result, the complex baseband signal can be common across the antenna elements 16, and thus does not affect the direction of the respective beam B. Accordingly, the direction of each of the beams $B_1$ through $B_Y$ can be determined by the set of antenna weights corresponding to that respective one of the beams $B_1$ through $B_Y$. The multiplication of the complex baseband signal by the set of antenna weights, when used to generate and subsequently transmit the element signals, can (e.g., via constructive interference) result in the respective one of the beams $B_1$ through $B_Y$ being formed in the desired direction and containing the associated data signal DS based on the superposition of all of the element signals associated with the respective antenna elements 16. Each of the beams $B_1$ through $B_Y$ can be formed in this manner to allow beams associated with different data signals (e.g., the data signals $DS_1$ through $DS_Y$) to be transmitted simultaneously in different directions from the antenna system 10 via the antenna elements 16.

By implementing the modulation of the data signals DS and the beamforming signal BF together via the baseband DSP 22, the combined beamforming data signals $\Phi A$ can be generated in the digital domain. Therefore, the digital combined beamforming data signals $\Phi A$ are modulated onto the analog element carrier signals ES in the antenna elements 16 to provide for concurrent transmission of multiple separate and independent beams $B_1$ through $B_Y$ from the antenna system 10. Furthermore, by digitally combining the data signals DS and the beamforming signals BF via the baseband DSP 22, the antenna system 10 can achieve concurrent transmission of the multiple independent beams $B_1$ through $B_Y$ in a more hardware efficient manner as opposed to typical antenna systems that transmit multiple beams $B_1$ through $B_Y$. For example, a phased-array antenna system that transmits multiple independent beams $B_1$ through $B_Y$ by concurrently combining modulated analog signals at each of the associated antenna elements requires significantly more hardware, and thus a significant increase in cost and physical space. However, as described herein, by digitally modulating the data signals DS and the beamforming signal BF together via the baseband DSP 22, the phase and/or amplitude information of each of the multiple beams $B_1$ through $B_Y$ is already digitally combined before being provided to the antenna elements 16. As a result, the antenna elements 16 need not include respective sets of combining hardware, which thus provides for a more simplified and efficient beam combining scheme to provide transmission of the multiple beams $B_1$ through $B_Y$ from the phased-array antenna system 10.

Figure 2:
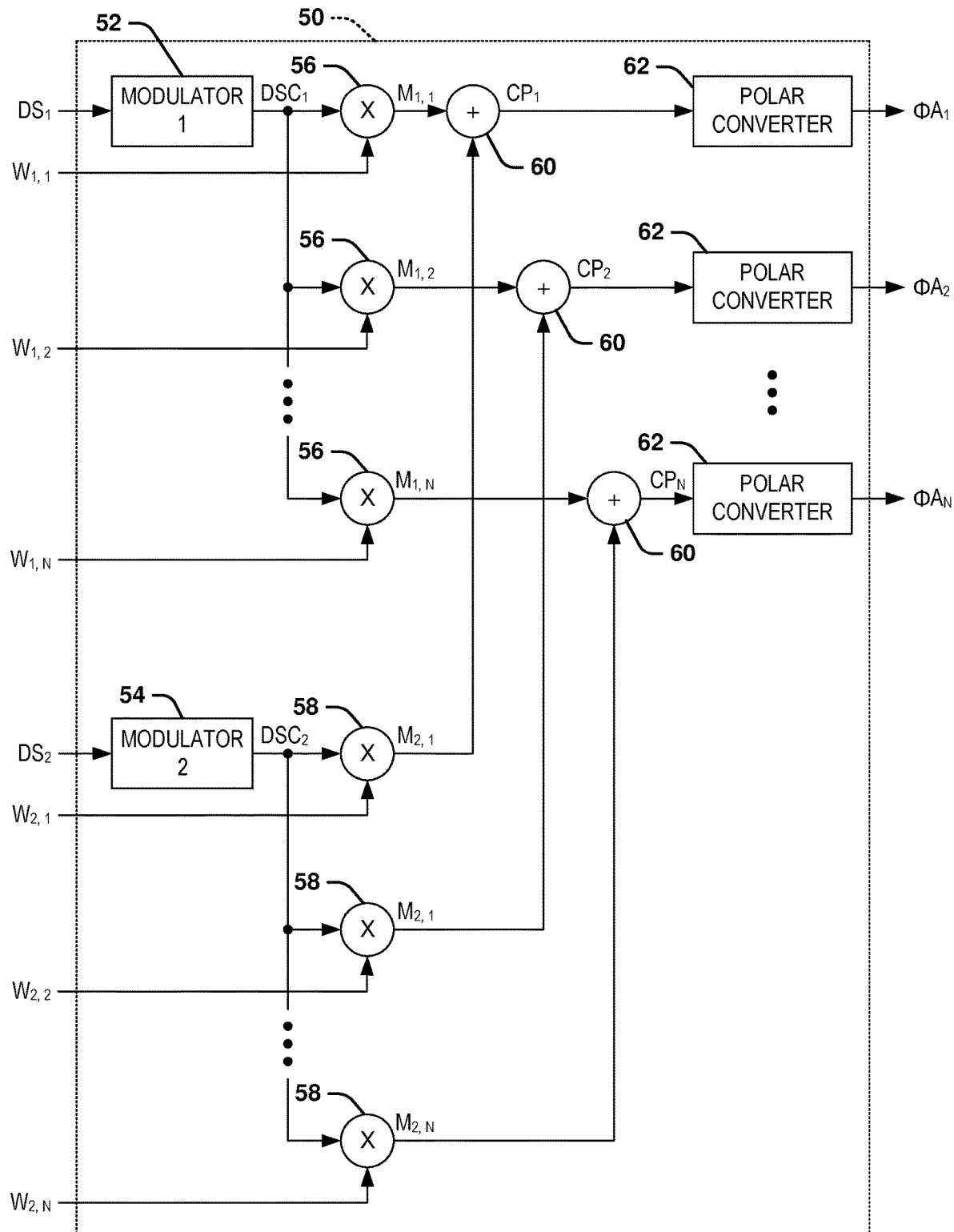
FIG. 2 illustrates an example of a baseband digital signal processor.

FIG. 2 illustrates an example of a baseband DSP 50. The baseband DSP 50 can correspond to the baseband DSP 22 in the example of FIG. 1. Therefore, reference is to be made to the example of FIG. 1 in the following description of the example of FIG. 2.

The baseband DSP 50 includes a first modulator 52 and a second modulator 54 that each correspond to separate beams $B_1$ and $B_2$ to be transmitted from the antenna system 10. The first modulator 52 is configured to receive the first data signal $DS_1$ and to convert the first data signal $DS_1$ into a complex baseband signal, demonstrated in the example of FIG. 2 as $DSC_1$. Similarly, the second modulator 54 is configured to receive the second data signal $DS_2$ and to convert the second data signal $DS_2$ into a complex baseband signal, demonstrated in the example of FIG. 2 as $DSC_2$. For example, the complex baseband signals $DSC_1$ and $DSC_2$ can each include in-phase and quadrature-phase channels that collectively form a complex phasor. In the example of FIG. 2, the baseband DSP 50 includes only two modulators 52 and 54, thus rendering Y=2 by example. However, it is to be understood that the baseband DSP 50 can include more than two modulators, each corresponding to a separate one of the beams $B_1$ and $B_2$ concurrently transmitted from the antenna system 10.

The complex baseband signals $DSC_1$ and $DSC_2$ are demonstrated as each being modulated by N separate antenna weights W that can also correspond to complex phasors associated with beamforming information. In the example of FIG. 2, the antenna weights W are demonstrated as numbering in a quantity N for each of the modulators 52 and 54, with N corresponding to the number of antenna elements 16, as provided in the example of FIG. 1. The baseband DSP 50 is demonstrated as receiving a first set of antenna weights $W_{1,1}$ through $W_{1,N}$ corresponding to the first modulator 52 and a second set of antenna weights $W_{2,1}$ through $W_{2,N}$ corresponding to the second modulator 54. For example, each of the beamforming signals BF can correspond to a set of the antenna weights corresponding to a respective one of the separate beams $B_1$ and $B_2$ to be transmitted from the antenna system 10. For example, the first beamforming signal $BF_1$ can correspond to the antenna weights $W_{1,1}$ through $W_{1,N}$, and the second beamforming signal $BF_2$ can correspond to the antenna weights $W_{2,1}$ and $W_{2,N}$.

In the example of FIG. 2, the baseband DSP 50 includes a first set of digital multipliers 56 and a second set of digital multipliers 58. The first set of digital multipliers 56 are configured to multiply the complex baseband signal $DSC_1$ by each of the antenna weights of the first set of antenna weights $W_{1,1}$ through $W_{1,N}$. Similarly, the second set of digital multipliers 58 are configured to multiply the complex baseband signal $DSC_2$ by each of the antenna weights of the first set of antenna weights $W_{2,1}$ through $W_{2,N}$. Therefore, the digital multipliers 56 and 58 provide the modulation of the complex baseband signals $DSC_1$ and $DSC_2$ with the respective sets of antenna weights W. In the example of FIG. 2, the first set of digital multipliers 56 generate a set of individual beamforming data signals $M_{1,1}$ through $M_{1,N}$ corresponding to a product of the complex baseband signal $DSC_1$ and the respective first set of antenna weights $W_{1,1}$ through $W_{1,N}$. Similarly, the second set of digital multipliers 58 generate a set of individual beamforming data signals $M_{2,1}$ through $M_{2,N}$ corresponding to a product of the complex baseband signal $DSC_2$ and the respective first set of antenna weights $W_{2,1}$ through $W_{2,N}$. As an example, the individual beamforming data signals $M_{1,1}$ through $M_{1,N}$ and $M_{2,1}$ through $M_{2,N}$ can correspond to complex phasors each including an in-phase portion and a quadrature-phase portion.

The baseband DSP 50 also includes a set of adders 60 that are each configured to add one of the individual beamforming data signals $M_{1,1}$ through $M_{1,N}$ with a corresponding one of the individual beamforming data signals $M_{2,1}$ through $M_{2,N}$. Therefore, each of the adders 60 generates a combined beamforming data signal, demonstrated in the example of FIG. 2 as combined beamforming data signals $CP_1$ through $CP_N$, that each correspond to a sum of a set of one of the individual beamforming data signals $M_{1,1}$ through $M_{1,N}$ and a corresponding one of the individual beamforming data signals $M_{2,1}$ through $M_{2,N}$ that is associated with the modulators 52 and 54, and thus each of the separate beams $B_1$ and $B_2$ to be transmitted from the antenna system 10. Similar to as described previously, the combined beamforming data signals $CP_1$ through $CP_N$ can correspond to complex phasors including an in-phase portion and a quadrature-phase portion. Therefore, each of the combined beamforming data signals $CP_1$ through $CP_N$ includes data and beamforming information associated with each of the separate beams $B_1$ and $B_2$ to be transmitted from the antenna system 10. The combined beamforming data signals $CP_1$ through $CP_N$ are provided to polar converters 62 that are configured to convert the combined beamforming data signals $CP_1$ through $CP_N$ to a polar coordinate system to generate the respective combined beamforming data signals $\Phi A_1$ through $\Phi A_N$. Accordingly, each of the combined beamforming data signals $\Phi A_1$ through $\Phi A_N$ can include phase and amplitude portions corresponding to each of the data signals $DS_1$ and $DS_2$. The combined beamforming data signals $\Phi A_1$ through $\Phi A_N$ are thus provided to the antenna elements 16, as described previously in the example of FIG. 1, for modulation of the respective element carrier signals ES for transmission of each of the separate beams $B_1$ and $B_2$.

Figure 3:
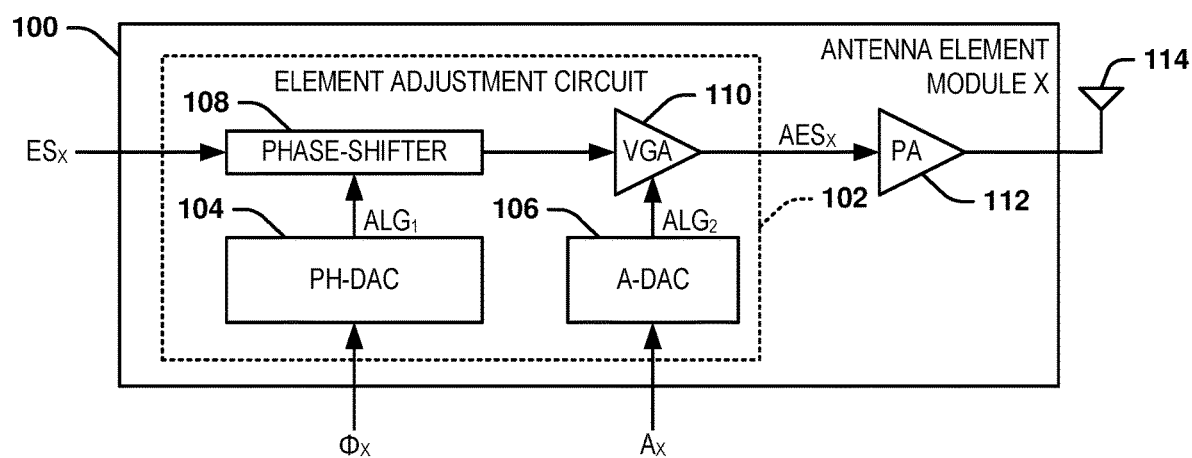
FIG. 3 illustrates an example of an antenna element.

FIG. 3 illustrates an example of an antenna element 100. The antenna element 100 can correspond to one of the antenna elements 16 in the example of FIG. 1. Particularly, the antenna element 100 is demonstrated in the example of FIG. 3 as "ANTENNA ELEMENT X", where X corresponds to a given one of the N antenna elements 16. Therefore, reference is to be made to the examples of FIGS.

1 and 2 in the following example of FIG. 3. As an example, the antenna element 100 can be fabricated as a multi-layer integrated circuit.

The antenna element 100 includes an element adjustment circuit 102 that is configured to modulate a respective one of the element carrier signals, demonstrated in the example of FIG. 3 as $ES_X$, with a respective combined beamforming data signal ΦA to generate a respective element signal, demonstrated in the example of FIG. 3 as $AES_X$. In the example of FIG. 3, the combined beamforming data signal ΦA is demonstrated as being separated into a phase portion, demonstrated as $Φ_X$, and an amplitude portion $A_X$. The phase portion $Φ_X$ thus corresponds to the phase information associated with the respective combined beamforming data signal $ΦA_X$, and thus the desired phase of the resultant respective element signal $AES_X$. Similarly, the amplitude portion $A_X$ thus corresponds to the amplitude information associated with the combined beamforming data signal $ΦA_X$, and thus the desired amplitude of the resultant respective element signal $AES_X$.

In the example of FIG. 3, the element adjustment circuit 102 includes at least one DAC. In the example of FIG. 3, the at least one DAC includes a first DAC 104, demonstrated as "PH-DAC", and a second DAC 106, demonstrated as "A-DAC". The first DAC 104 is configured to convert the phase portion $Φ_X$ of the combined beamforming data signal $ΦA_X$ into a first analog signal $ALG_1$. In the example of FIG. 3, the first analog signal $ALG_1$ is provided to a phase-shifter 108 that is configured to modulate the respective element carrier signal $ES_X$ based on the first analog signal $ALG_1$. As an example, the phase-shifter 108 can be configured as a vector modulator, such that the phase-shifter 108 can provide a phase-shift of the respective element carrier signal $ES_X$ based on the phase information associated with the phase portion $Φ_X$ of the combined beamforming data signal $ΦA_X$.

Similarly, the second DAC 106 is configured to convert the amplitude portion $A_X$ of the combined beamforming data signal $ΦA_X$ into a second analog signal $ALG_2$. The second analog signal $ALG_2$ is provided to a variable gain amplifier (VGA) 110 that is configured to modulate the respective element carrier signal $ES_X$ based on the second analog signal $ALG_2$. As an example, the VGA 110 can provide amplification of the respective phase-shifted element carrier signal $ES_X$ based on the amplitude information $A_X$ of the combined beamforming data signal $ΦA_X$ to generate the respective element signal $AES_X$.

The element signal $AES_X$ is thus provided from the element adjustment circuit 102 to a power amplifier (PA) 112, and can thus be transmitted from the antenna element 100 via a radiating element 114. As a result, the respective element signal $AES_X$ can be transmitted along with the remaining element signals AES from the respective other antenna elements 100 in a relatively phase-shifted manner that defines a transmission direction of the aggregate beams $B_1$ through $B_Y$ (e.g., $B_1$ and $B_2$). Accordingly, the aggregate beams can propagate the data signals $DS_1$ through $DS_Y$ (e.g., $DS_1$ and $DS_2$) modulated onto the aggregate beams (e.g., via the respective element signals AES) in directions that are based on the respective beamforming signals BF (e.g., the antenna weights $W_{1,1}$ through $W_{1,N}$ and antenna weights $W_{2,1}$ through $W_{2,N}$).

As described previously, the combined beamforming data signals ΦA can include phase information, and can also include amplitude information, such as to generate a modulation scheme associated with a specific type of data constellation. As a first example, the combined beamforming data signal ΦA can include phase information only, such as to generate a phase-shift keying (PSK) modulation scheme associated with one or more of the transmitted beams $B_1$ through $B_Y$. As another example, the combined beamforming data signal ΦA can include both phase information and amplitude information, such as to generate an amplitude phase-shift keying (APSK) modulation scheme associated with one or more of the transmitted beams $B_1$ through $B_Y$.

Figure 4:
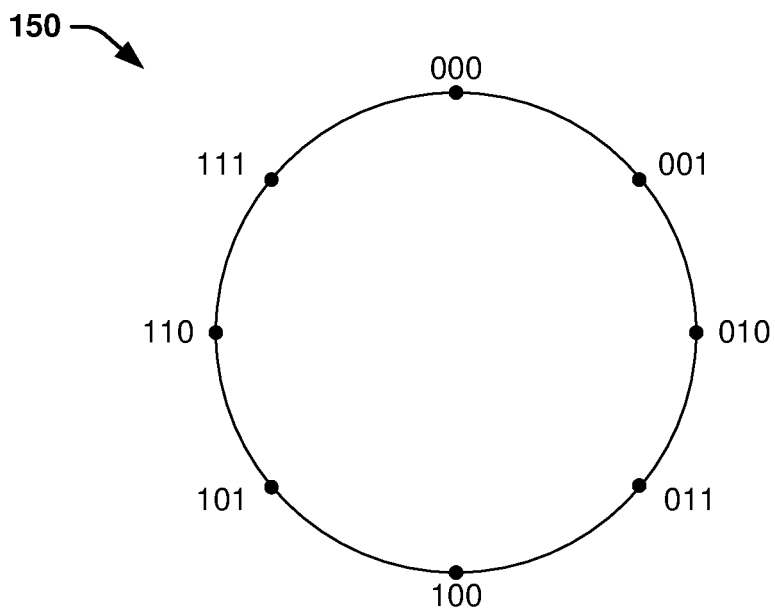
FIG. 4 illustrates an example of a PSK modulation scheme.

FIG. 4 illustrates an example diagram 150 of a PSK modulation scheme. The diagram 150 demonstrates a circle with eight separate states arranged in 45° intervals about a constellation, as defined by a three-bit code, and thus demonstrates an 8-PSK code. Therefore, the three bits of the data code can correspond to the angle of a data code about the constellation. However, as an example, fewer or additional PSK modulation codes can be implemented based on the data controller 20.

Figure 5:
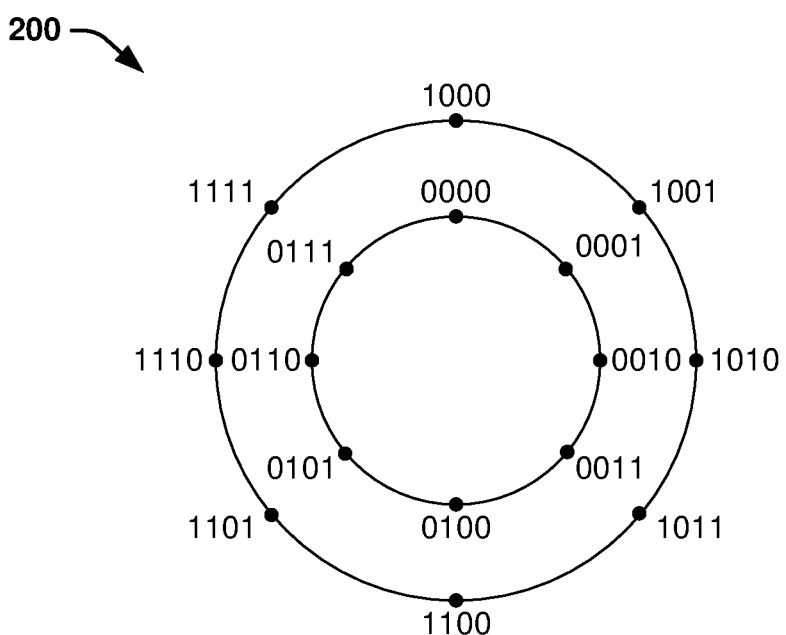
FIG. 5 illustrates an example of an APSK modulation scheme.

FIG. 5 illustrates an example diagram 200 of an APSK modulation scheme. The diagram 200 demonstrates two concentric circles, each with eight separate states arranged in 45° intervals about a constellation. The diagram 200 thus demonstrates a 16-APSK code, as defined by a four-bit data code. In the example of FIG. 5, the most significant bit determines a distance from center of the code, and thus the three additional bits dictate the angle of the code in the constellation. However, as an example, fewer or additional APSK modulation codes can be implemented by the data controller 20.

Figure 6:
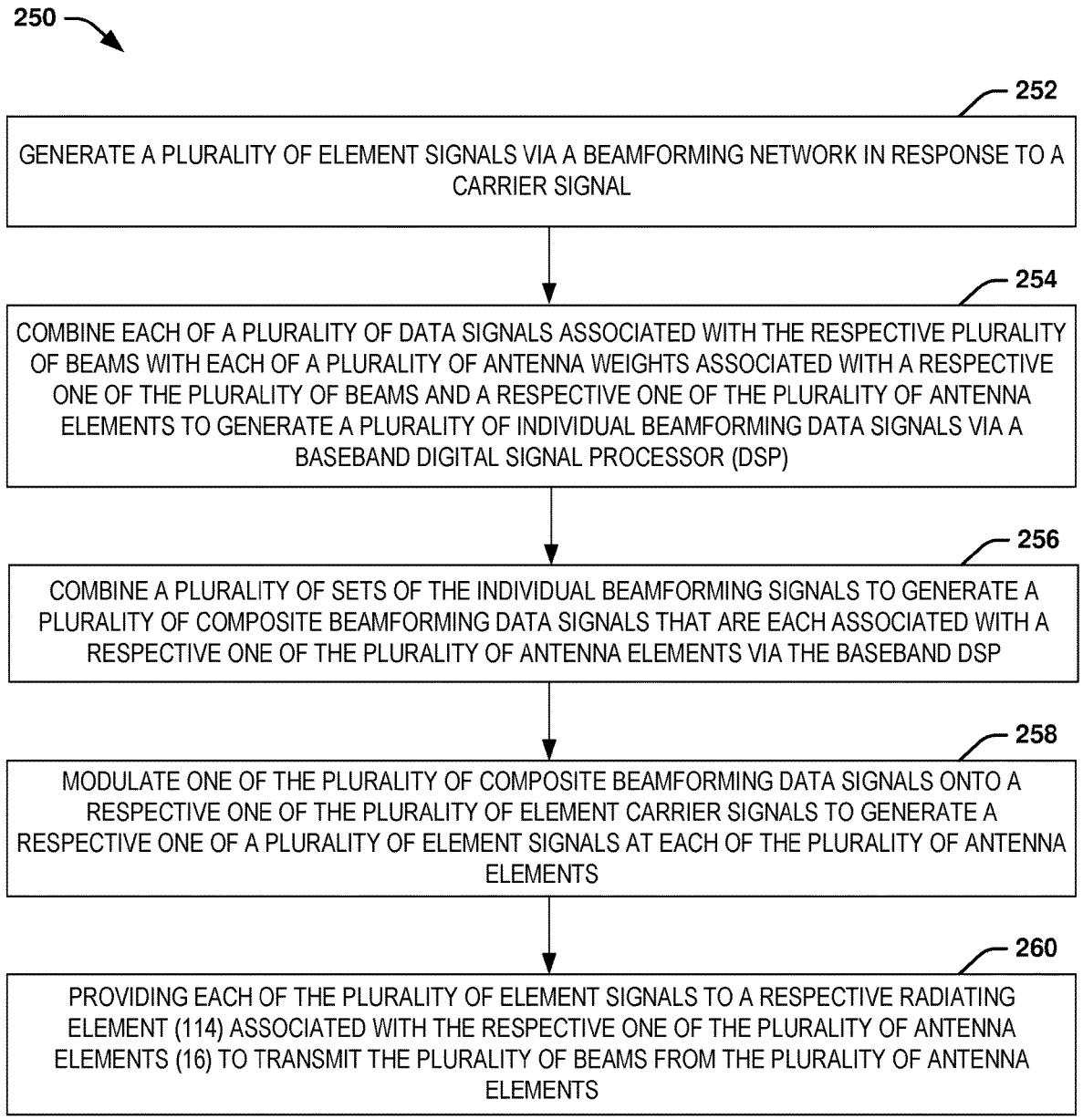
FIG. 6 illustrates an example of a method for transmitting a plurality of beams from a phased-array antenna system.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for transmitting a plurality of beams (e.g., the beams $B_1$ through $B_Y$) from a phased-array antenna system (e.g., the antenna system 10). At 252, a plurality of element carrier signals (e.g., the element carrier signals ES) are generated via a beamforming network (e.g., the beamforming network 14) in response to a carrier signal (e.g., the carrier signal BS). At 254, each of a plurality of data signals (e.g., the data signals DS) associated with the respective plurality of beams (e.g., the beams $B_1$ through $B_Y$) is combined with each of a plurality of beamforming signals (e.g., the beamforming signals BF) to generate a plurality of individual beamforming data signals (e.g., the individual beamforming data signals M) via a baseband DSP (e.g., the baseband DSP 22). Each of the plurality of beamforming signals can be associated with a respective one of a plurality of antenna elements (e.g., the antenna element 16) and one of the plurality of beams.

At 256, a plurality of sets of the individual beamforming signals are combined to generate a plurality of composite beamforming data signals (e.g., the combined beamforming data signals DA) that are each associated with a respective one of the plurality of antenna elements via the DSP. At 258, each of the plurality of combined beamforming data signals are modulated onto a respective one of the plurality of element carrier signals to generate a respective one of a plurality of element signals (e.g., the element signal $AES_x$). At 260, each of the plurality of element signals are provided to a respective radiating element (e.g., the radiating element 114) associated with a respective plurality of antenna elements to transmit the plurality of beams from the plurality of antenna elements.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A phased-array antenna system comprising:
   a plurality of antenna elements each comprising an element adjustment circuit and a radiating element;
   a beamforming network configured to receive a carrier signal at a carrier signal port to generate a plurality of element carrier signals, wherein each element carrier signal is generated at a respective one of a plurality of element carrier signal ports that is coupled to one of the plurality of antenna elements; and
   a baseband digital signal processor (DSP) configured to generate a plurality of composite beamforming data signals each comprising a phase portion and an amplitude portion, wherein each of the plurality of composite beamforming data signals is associated with a respective one of the plurality of antenna elements and is generated based on combining a plurality of individual beamforming data signals, wherein each of the plurality of individual beamforming data signals is associated with a respective beam of a plurality of beams and is based on combining one of a plurality of data signals associated with the respective one of the plurality of beams with an antenna weight associated with the respective one of the plurality of beams and the respective one of the plurality of antenna elements,
   wherein the element adjustment circuit of the respective one of the antenna elements is configured to modulate the associated composite beamforming data signal onto the respective one of the element carrier signals to generate a respective element signal that is provided to the respective radiating element, such that the plurality of beams are generated from the plurality of antenna elements, wherein the element adjustment circuit of each of the antenna elements is configured to phase-shift the respective element carrier signal based upon the phase portion of the respective one of the plurality of composite beamforming data signals, and to amplify the respective phase-shifted element carrier signal based upon the amplitude portion of the respective one of the plurality of composite beamforming data signals.

2. The system of claim 1, wherein the element adjustment circuit of each of the antenna elements comprises:
   a phase-shifter configured to phase-shift the respective element carrier signal based upon the phase portion of the respective one of the plurality of composite beamforming data signals; and
   a variable gain amplifier configured to amplify the respective phase-shifted element carrier signal, based upon the amplitude portion of the respective one of the plurality of composite beamforming data signals, to generate the respective element signal.

3. The system of claim 2, wherein the element adjustment circuit of each of the antenna elements further comprises:
   a phase digital-to-analog converter (DAC) configured to convert the phase portion of the respective one of the plurality of composite beamforming data signals to a first analog signal; and
   an amplitude DAC configured to convert the amplitude portion of the respective one of the plurality of composite beamforming data signals to a second analog signal;
   wherein the phase-shifter is configured to phase-shift the respective element carrier signal in response to the first analog signal; and
   wherein the variable gain amplifier is configured to amplify the respective phase-shifted element carrier signal in response to the second analog signal to generate the respective element signal.

4. The system of claim 1, wherein the baseband DSP is configured to modulate one of a plurality of antenna weights associated with one of a plurality of beamforming signals associated with a respective one of the plurality of beams onto a respective one of the plurality of data signals to generate a set of the individual beamforming data signals associated with the respective one of the plurality of antenna elements, wherein the baseband DSP is further configured to add each of the individual beamforming data signals for each of the sets of the individual beamforming data signals to generate the respective composite beamforming data signal of the plurality of composite beamforming data signals that is associated with the respective one of the plurality of antenna elements.

5. The system of claim 4, wherein the baseband DSP further comprises a plurality of polar converters, each of the plurality of polar converters is associated with a respective one of the plurality of antenna elements and is configured to generate a respective one of the plurality of composite beamforming data signals comprising a phase portion and an amplitude portion in response to the respective composite beamforming data signal.

6. The system of claim 3, wherein the phase portion corresponds to a phase-shift keying (PSK) code, such that the phase DAC is configured to generate the first analog signal comprising the phase portion of the respective composite beamforming data signal.

7. The system of claim 3, wherein the phase portion and the amplitude portion collectively correspond to an amplitude phase-shift keying (APSK) code, such that the phase DAC is configured to generate the first analog signal comprising the phase portion of the respective composite beamforming data signal and the amplitude DAC is configured to generate the second analog signal comprising the amplitude portion of the respective composite beamforming data signal.

8. The system of claim 7, wherein the APSK code comprises a three-bit phase portion and a one-bit amplitude portion, such that the APSK code is a 16-APSK modulation code.

9. The system of claim 1, wherein the antenna system comprises a beam source configured to generate the carrier signal in response to an oscillator signal having a predetermined frequency.

10. The system of claim 1, further comprising a data controller configured to generate the plurality of data signals and to provide the plurality of data signals to each of the plurality of antenna elements.

11. The system of claim 1, further comprising a beamforming controller configured to generate the plurality of beamforming signals associated with the plurality of beams, wherein each of the plurality of beamforming signals corresponds to a transmission direction of one of the plurality of beams.

12. A method for transmitting a plurality of beams from a phased-array antenna system, the method comprising:
generating a plurality of element carrier signals via a beamforming network in response to a carrier signal;
combining each of a plurality of data signals associated with the respective plurality of beams with each of a plurality of antenna weights associated with a respective one of the plurality of beams and a respective one of a plurality of antenna elements to generate a plurality of individual beamforming data signals via a baseband digital signal processor (DSP);
combining a plurality of sets of the individual beamforming signals to generate a plurality of composite beamforming data signals that each comprise a phase portion and an amplitude portion and that are each associated with a respective one of the plurality of antenna elements via the baseband DSP;
modulating one of the plurality of composite beamforming data signals onto a respective one of the plurality of element carrier signals to generate a respective one of a plurality of element signals at each of the plurality of antenna elements, wherein modulating the respective one of the composite beamforming data signals onto a respective one of the plurality of element carrier signals comprises:
phase-shifting the respective element carrier signal based upon the phase portion of the respective one of the plurality of composite beamforming data signals; and
amplifying the respective phase-shifted element carrier signal, based upon the amplitude portion of the respective one of the plurality of composite beamforming data signals, to generate the respective element signal; and
providing each of the plurality of element signals to a respective radiating element associated with the respective one of the plurality of antenna elements to transmit the plurality of beams from the plurality of antenna elements.

13. The method of claim 12, wherein combining each of the plurality of data signals comprises modulating one of a plurality of antenna weights associated with one of a plurality of beamforming signals associated with a respective one of the plurality of beams onto a respective one of the plurality of data signals to generate a set of the individual beamforming data signals associated with the respective one of the plurality of antenna elements, the method further comprising adding each of the individual beamforming data signals for each of the sets of the individual beamforming data signals to generate the respective composite beamforming data signal of the plurality of composite beamforming data signals that is associated with the respective one of the plurality of antenna elements.

14. The method of claim 13, further comprising:
generating each of the plurality of composite beamforming data signals comprising a phase portion and an amplitude portion;
converting the phase portion of the respective one of the plurality of composite beamforming data signals to a first analog signal; and
converting the amplitude portion of the respective one of the plurality of composite beamforming data signals to a second analog signal;
wherein the phase-shifting comprises phase-shifting the respective element carrier signal in response to the first analog signal; and
wherein the amplifying comprises amplifying the respective phase-shifted element carrier signal in response to the second analog signal to generate the respective element signal.

15. The method of claim 14, wherein the phase portion corresponds to a phase-shift keying (PSK) code, wherein converting the phase portion comprises generating the first analog signal comprising the phase portion of the respective composite beamforming data signal.

16. The method of claim 14, wherein the phase portion and the amplitude portion collectively correspond to an amplitude phase-shift keying (APSK) code, wherein converting the phase portion comprises generating the first analog signal comprising the phase portion of the respective composite beamforming data signal and wherein converting the amplitude portion comprises generating the second analog signal comprising the amplitude portion of the respective composite beamforming data signal.

17. The method of claim 16, wherein the APSK code comprises a three-bit phase portion and a one-bit amplitude portion, such that the APSK code is a 16-APSK modulation code.

18. The method of claim 12, further comprising generating the carrier signal in response to an oscillator signal having a predetermined frequency.

19. The method of claim 12, further comprising:
generating the plurality of data signals via a data controller; and
providing the plurality of data signals to each of the plurality of antenna elements.

20. The method of claim 12, further comprising generating the plurality of beamforming signals via a beamforming controller, wherein each of the plurality of beamforming signals corresponds to a transmission direction of one of the plurality of beams.

* * * * *